US010083448B2

(12) United States Patent
Cheng et al.

(10) Patent No.: US 10,083,448 B2
(45) Date of Patent: Sep. 25, 2018

(54) SYSTEM AND METHOD FOR INTERMEDIARY AGENCY TO FIND BETTER SERVICE PROVIDERS

(71) Applicant: SAP SE, Walldorf (DE)

(72) Inventors: Yu Cheng, Shanghai (CN); Mengjiao Wang, Shanghai (CN); Wen-Syan Li, Shanghai (CN)

(73) Assignee: SAP SE, Walldorf (DE)

(*) Notice: Subject to any disclaimer, the term of this patent is extended or adjusted under 35 U.S.C. 154(b) by 755 days.

(21) Appl. No.: 14/576,230

(22) Filed: Dec. 19, 2014

(65) Prior Publication Data

US 2016/0180346 A1 Jun. 23, 2016

(51) Int. Cl.
*G06Q 30/00* (2012.01)
*G06Q 50/30* (2012.01)

(52) U.S. Cl.
CPC .......... *G06Q 30/016* (2013.01); *G06Q 50/30* (2013.01)

(58) Field of Classification Search
CPC .............................. G06Q 30/016; G06Q 50/30
See application file for complete search history.

(56) References Cited

U.S. PATENT DOCUMENTS

| | | | | |
|---|---|---|---|---|
| 2004/0225544 A1* | 11/2004 | Camer | ............. | G06Q 10/06311 705/7.13 |
| 2006/0034201 A1* | 2/2006 | Umeda | ............. | G06Q 30/02 370/310 |
| 2008/0281663 A1* | 11/2008 | Hakim | ............. | B60L 11/1824 705/7.25 |
| 2009/0313077 A1* | 12/2009 | Wheeler, IV | ............. | G01C 21/26 705/7.14 |
| 2012/0239452 A1* | 9/2012 | Trivedi | ............. | G06Q 10/00 705/7.22 |
| 2013/0066688 A1* | 3/2013 | Pinkus | ............. | G06Q 10/06 705/7.41 |
| 2013/0252630 A1* | 9/2013 | Edge | ............. | H04W 4/06 455/456.1 |
| 2013/0346237 A1* | 12/2013 | Rademaker | ............. | G06Q 10/0836 705/26.8 |
| 2014/0051465 A1* | 2/2014 | Ruys | ............. | G08G 1/202 455/457 |
| 2015/0081362 A1* | 3/2015 | Chadwick | ............. | G06Q 50/30 705/7.14 |
| 2015/0278759 A1* | 10/2015 | Harris | ............. | G06Q 10/08355 705/338 |
| 2015/0302342 A1* | 10/2015 | Yeh | ............. | G06Q 10/063114 705/7.15 |
| 2015/0339923 A1* | 11/2015 | Konig | ............. | G08G 1/202 701/522 |

(Continued)

*Primary Examiner* — Sujay Koneru
(74) *Attorney, Agent, or Firm* — Klarquist Sparkman, LLP

(57) ABSTRACT

Disclosed herein is a framework for determining a service provider to service a customer request. In accordance with one aspect, a request from a customer is received by a decision module. The decision module further receives a response to the request from a first service provider, determines the average frequency of responses for a given time interval during the time and location of the request, estimates arrival time of the first service provider and near-by service providers to the location of the customer, ranks all service providers based on arrival time, and estimates a probability of a shorter customer wait time.

13 Claims, 4 Drawing Sheets

(56) References Cited

U.S. PATENT DOCUMENTS

2015/0356703 A1* 12/2015 Ellis ..................... G06Q 50/30
                                                    705/7.17
2016/0025503 A1*  1/2016 Kees .................... G08G 1/144
                                                    701/400

* cited by examiner

SYSTEM AND METHOD FOR INTERMEDIARY AGENCY TO FIND BETTER SERVICE PROVIDERS

TECHNICAL FIELD

The present disclosure relates generally to providing intermediary agencies the ability to find better service providers.

BACKGROUND

For service providers, such as taxi cabs or taxi services, there may be an intermediary agency. Intermediary agencies leverage the gap between customers and service providers. Once an intermediary agency receives a service request from a customer, the agency may forward the service request to related service providers. The service providers may decide whether to accept or not accept the customer's request. For example, if there are multiple service providers that accept a particular customer request, the intermediary agency needs to decide which service provider to use. Typically, the service providers will not respond at the same time, and the intermediary agency will use the service provider that responds first. The service provider that responds first, however, may not be the best provider.

As an example, in recent years, mobile applications for taxi services have gained popularity. When a customer needs a taxi, the customer can initiate a mobile application and make a service request. The wireless enabled (e.g., GPS enabled) mobile phone can automatically acquire the location of the customer and send the request to nearby taxi drivers. The taxi drivers can receive the request by making a response to the passenger. Such mobile applications allow for convenient calling of taxis. The passengers no longer need to wait along the street to hail taxis.

These mobile applications may assign request and service orders by a first-response-first-get rule. Under the first-response-first-get rule, the first taxi driver who makes the first response is assigned the service order. However, the taxi driver who first responded may not be the nearest taxi to the passenger. For example, there may be another available taxi that is nearer to customer. Although this taxi may better serve the customer, it is not assigned the service order since its driver was not the first to respond. This situation results in the customer having to wait a longer time than necessary for a taxi.

From the foregoing discussion, it is desirable to provide an intermediary agency which reduces average waiting time of customers.

SUMMARY

Disclosed herein is a framework for determining a service provider to service a customer request. In accordance with one aspect, a request from a customer is received by a decision module, where the request includes time of request and location of the customer. The decision module further receives a response to the request from a first service provider, determines the average frequency of responses for a given time interval during the time and location of the request, estimates arrival time of the first service provider and near-by service providers to the location of the customer, ranks all service providers based on arrival time, and estimates a probability of a shorter customer wait time. If the probability of a shorter customer wait time is high, the framework waits for a service provider with shorter customer wait time to respond to the request, issues an order to the service provider with the shorter customer wait time to service the request, and if no service provider with shorter customer wait time responds to the request within a prescribed period of time, issues the order to the first service provider to service the request. If the probability of a shorter customer wait time is low, the framework issues the order to the first service provider to service the request.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein is a framework to replace a first-response-first-get rule. In certain implementations, the framework estimates the probability of a better provider that comes after a first response provider. If the probability is high, the first response provider is passed over, and the customer is served by the better provider. Such a system may be used in certain instant service intermediary agencies, such as instant taxi calling or taxi service/dispatch. The example of taxi drivers, dispatching services, and customer or passengers are used herein as an example; however, it is to be understood that other goods or services may be applicable.

Figure 1:
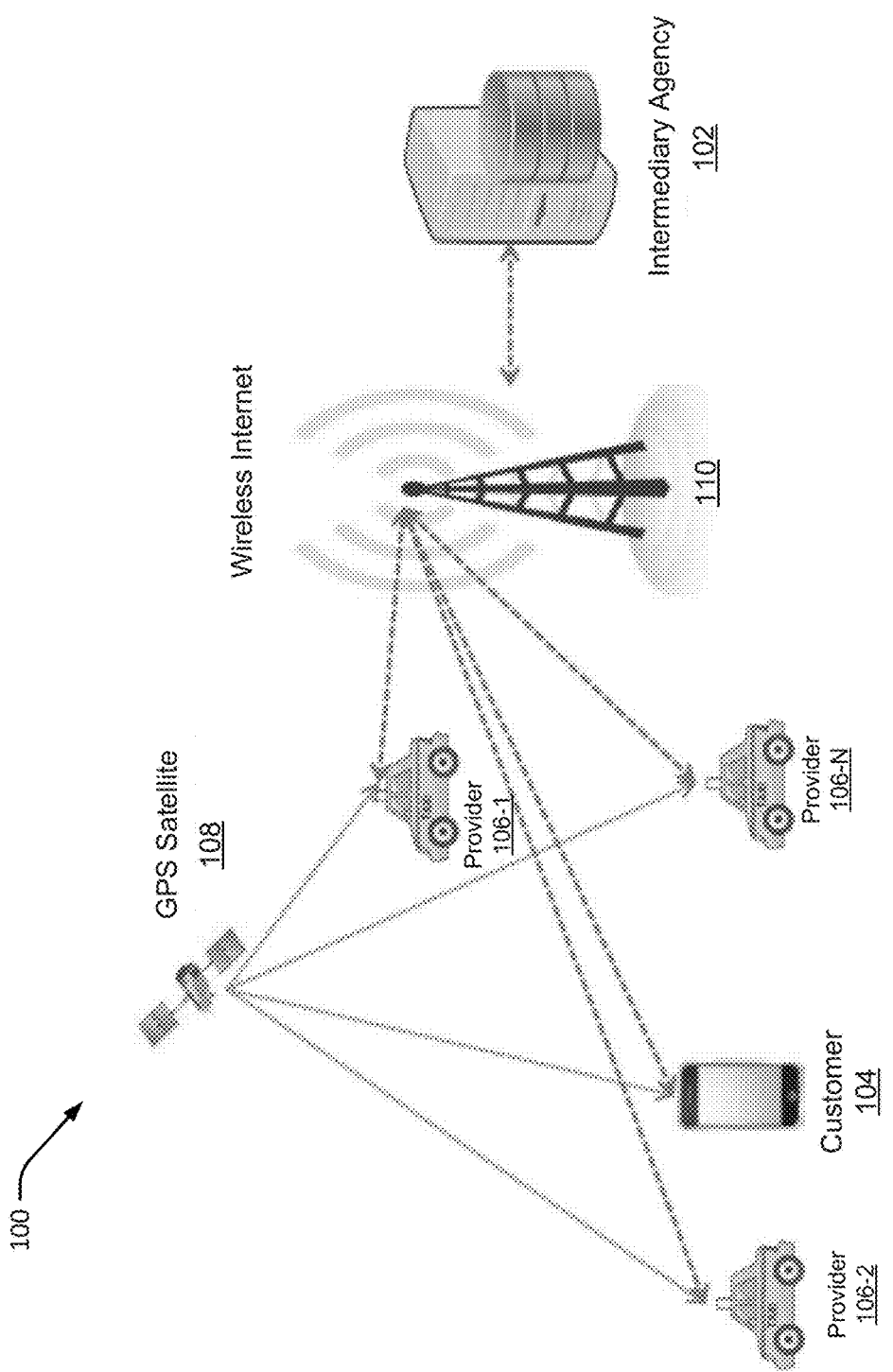
FIG. 1 illustrates an exemplary system.

FIG. 1 shows an example network or system 100 that implements the technologies described herein. The system includes an intermediary agency 102. In one implementation, the intermediary agency provides the best provider 106 to service a request from a customer 104. As shown, the intermediary agency provides the best taxi to service a request from a customer. Customer 104 has a mobile device that includes a mobile application to request such service from the intermediary agency 102. System 100 includes a number of service providers or taxis (drivers) 106-1 to 106-N. Customer 104 and service providers may be connected to one or more networks, such as a global positioning system or GPS network as represented by GPS satellite 108 and cellular system as represented by Wireless Internet system 110. GPS satellite 108 and Wireless Internet system 110 may also be used to locate position of customer 104 and taxis 106.

System 100 is implemented to reduce the average passenger or customer waiting time. In the system 100, once the first driver or taxi responds to an order from customer 104, intermediary agency 102 estimates the probability that nearer (i.e., better provider) drivers or taxis will respond to the request. If the probability is high, the system 100 and intermediary agency 102 will wait for the nearer (better) drivers or taxis 106 to respond, and give the order to the most convenient (best) driver or taxi 106 that has responded. If the probability is low, the system the system 100 and intermediary agency 102 will give the order to the first-response driver or taxi 106 directly. "Near" and "far", may be measured by arrival time, which, in one implementation, is calculated according to real-time traffic and graphical information system or GIS information from a database accessed by the intermediary agency 102.

In one implementation, the number of drivers or taxis 106 that make a response in a given time interval follows a Poisson distribution with a parameter lambda or λ. The parameter λ, is defined as the average response time in a given time interval of all drivers or taxis 106. The parameter λ, may be estimated from historical data. The parameter λ, may be different for different hours and different areas. For example, λ, may be higher in peak hours as most of the drivers or taxis 106 are busier and λ, may be low in some areas as the drivers in such areas tend to response faster. Therefore, different λ, may be used for different hours and areas.

The use of a Poisson distribution based model may help to reduce the average passenger waiting time. An integrated real time graphical information system or GIS information navigation service, such as Google™ map or Bing™ map with real-time traffic flow, may be integrated into system 100 to get more accurate paths and taxi arrival times.

Figure 2:
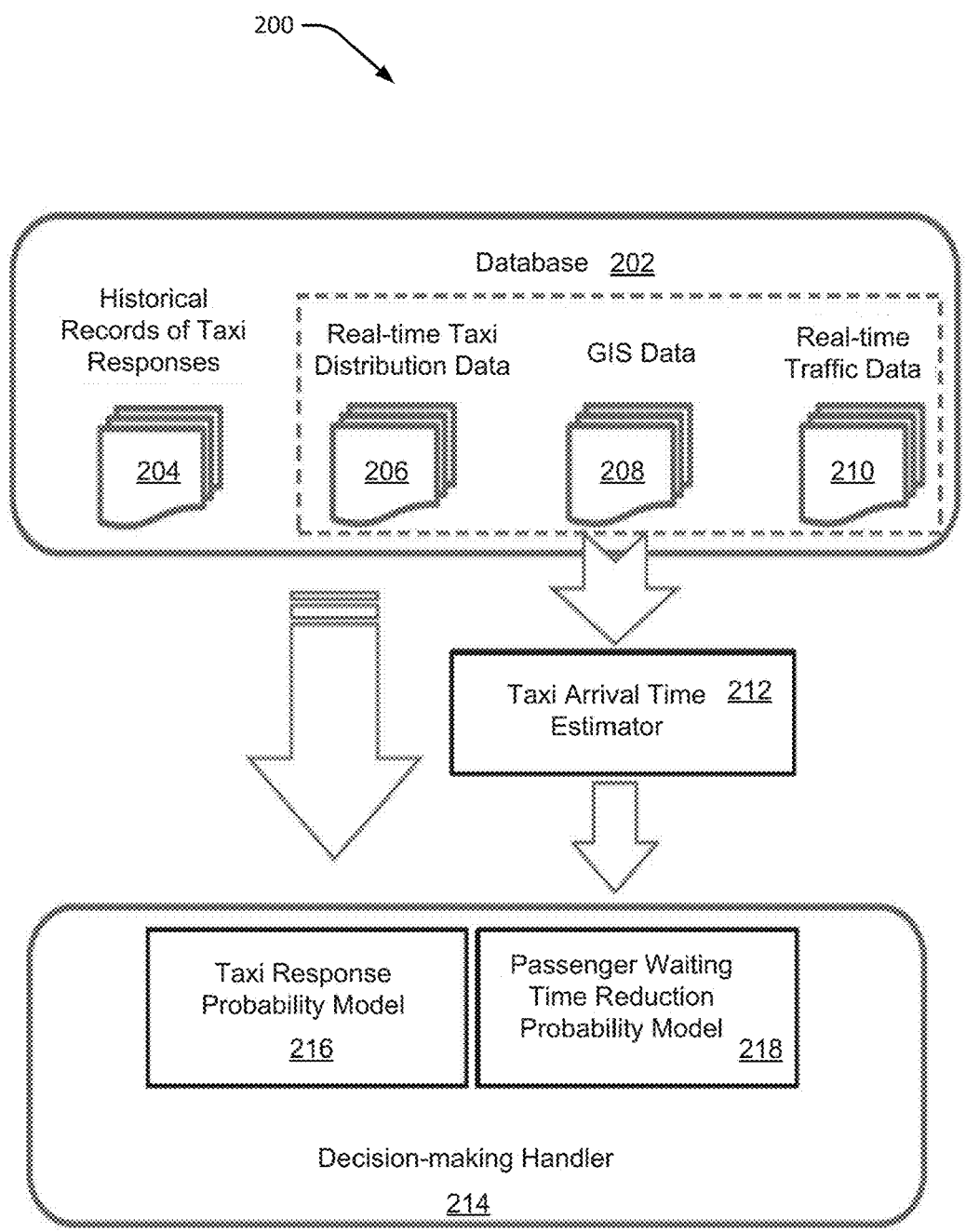
FIG. 2 illustrates an exemplary system architecture.

FIG. 2 shows an exemplary system architecture 200. In certain implementations, the architecture 200 is part of intermediary agency. In certain implementations, the architecture 200 is part of a decision module integrated as hardware, firmware, software, or a combination in one or more computing devices, such as described in FIG. 4 below. The architecture 200 allows the ability to determine questions, such as "is current responding taxi good enough", or "is there possibility of shorter waiting time by a later responding taxi." The decision module may be incorporated into the intermediary agency.

The architecture 200 may include a database 202. Database 202 may store historical record of taxi response 204, real time taxi distribution data 206, GIS data 208, and real time traffic 210. Architecture 200 may also include a Taxi Arrival Time estimator 212, which is used to calculate the arrival time of each taxi based on information from database 202. In addition architecture 200 may also include a decision making handler 214, which is used to decide which driver or taxi 106 to assign the order.

The database 202 may store all the essential data. Historical records of taxi responses 204 may be used to estimate the parameter λ, of a Poisson distribution. Historical records of taxi responses 204 may include at least response time of all the drivers in a given area and given time stamp. The real-time taxi distribution data 206 may include the real-time position of each taxi 106. The near-by taxi 106 may be obtained from real-time taxi distribution data 206 by setting a passenger position and near-by threshold. The GIS data 208 and real time traffic data 210 is the data used for the estimation of arrival time. The GIS data 208 may provide a more accurate distance between passenger or customer 104 and drivers or taxis 106, whereas real time traffic data 210 will affect the arrival time. In certain implementations, the GIS data 208 and real time traffic data 210 may be a third party service such as Google™ map and Bing™ map.

Taxi Arrival Time estimator 212 may be real time. Taxi Arrival Time estimator 212 integrates the GIS data 208 and the real time traffic data 210 to estimate arrival time. The GIS data 208 gives the distance between passenger or customer 104 and driver or taxi 106, and by implementation in real-time, provides the speed that the driver or taxi 106 may drive at. Taxi Arrival Time estimator 212 may calculate the arrival time of each near-by driver or taxi 106.

The decision making handler 214 may include Taxi Response Probability model 216 which may be used to reduce passenger or customer waiting time. The Taxi Response Probability model 216 is used to identify if the current request-response is good and whether it would be worthwhile to wait for a response from another taxis.

For the Taxi Response Probability model 216, a value X is denoted as the number of occurrences of taxi responses to a service request in a given time interval δ. X is a random variable. In most of cases, X is proportional to a relatively small value of δ, e.g., 30 sec. The time interval δ is equal to the time that the decision-making handler should wait before making a decision for dispatching a taxi. As such, δ should be a relatively small value. Therefore, the probability of the number of occurrences has a Poisson distribution with parameter λ. As previously described, λ, may be interpreted as an average number of occurrences of a response to a request during the period δ. Parameter λ, may be related to occurrence, time and location, which may be obtained from historical records. The probability of occurrences of taxi responses in δ is generated by the following Equation 1.

$$P(X = x \mid \delta, \lambda) = \frac{e^{-\lambda}\lambda^x}{x!} \qquad \text{Equation 1}$$

where x=0, 1, 2, . . . denotes the number of occurrences. Therefore, it is possible to generate the probability of the event that there are x taxis that can respond to the request during time interval of δ.

The decision making handler 214 may include a Passenger Waiting Time Reduction Probability Model 218. Passenger Waiting Time Reduction Probability Model 218 may be used to determine the probability of shorter waiting time for a passenger or customer after pending time δ.

An assumption is made that there are M taxis that feasibly may respond to a certain request, among which one of them, i.e, the $j^{th}$ taxi takes the first response at time t. Arrival-time may be calculated for each taxi to the passenger or customer, then all the taxis 106 are sorted by their arrival-time. Therefore, a number N is derived, where 0<N<M−1. N is the number of taxis which have a sooner arrival time than the $j^{th}$ taxi. Based on this information, it is possible to calculate the probability of shorter waiting time for passenger or customer under various situations.

For example, if there are x other taxis that are able to respond to the service request, a probability of shorter waiting time for passenger or customer may be expressed as Equation 2.

$$P(X = x \mid M, N) = 1 - \frac{C^x_{M-1-N}}{C^x_{M-1}} \qquad \text{Equation 2}$$

where the second sector can be interpreted as a probability that all the other x taxis are placed into the group with later arrival time to the passenger or customer. In other words, Equation 2 provides a probability that at least one other taxi will take less time than $j^{th}$ taxi to pick up the passenger or customer.

Therefore, it is possible to obtain a probability of a shorter waiting time for a passenger or customer after pending time δ by Equations 1 and 2 as expressed by Equation 3.

$$Prob(X = x) =$$
$$P(X = x \mid \delta, \lambda) P(X = x \mid M, N) = \frac{e^{-\lambda}\lambda^x}{x!}\left(1 - \frac{C_{M-1-N}^x}{C_{M-1}^x}\right)$$

Equation 3 where x<M−1−N.

Equation 3 may be used to support the decision making process. For example, if it is determined that δ is short enough, the decision-making handler may decide to wait for a more appropriate taxi to respond to reduce passenger or customer waiting time.

There are several methods which can be used to make decisions through Equation 3. For example, one method is to calculate the maximum of Prob (X=x), where x=1, 2, . . . , M−1−N. If the value is larger than a pre-set threshold, the system may send the order after time of δ. Similarly, mean of Prob(X=x), x=1, 2, . . . , M−1−N may be used for the decision.

Figure 3:
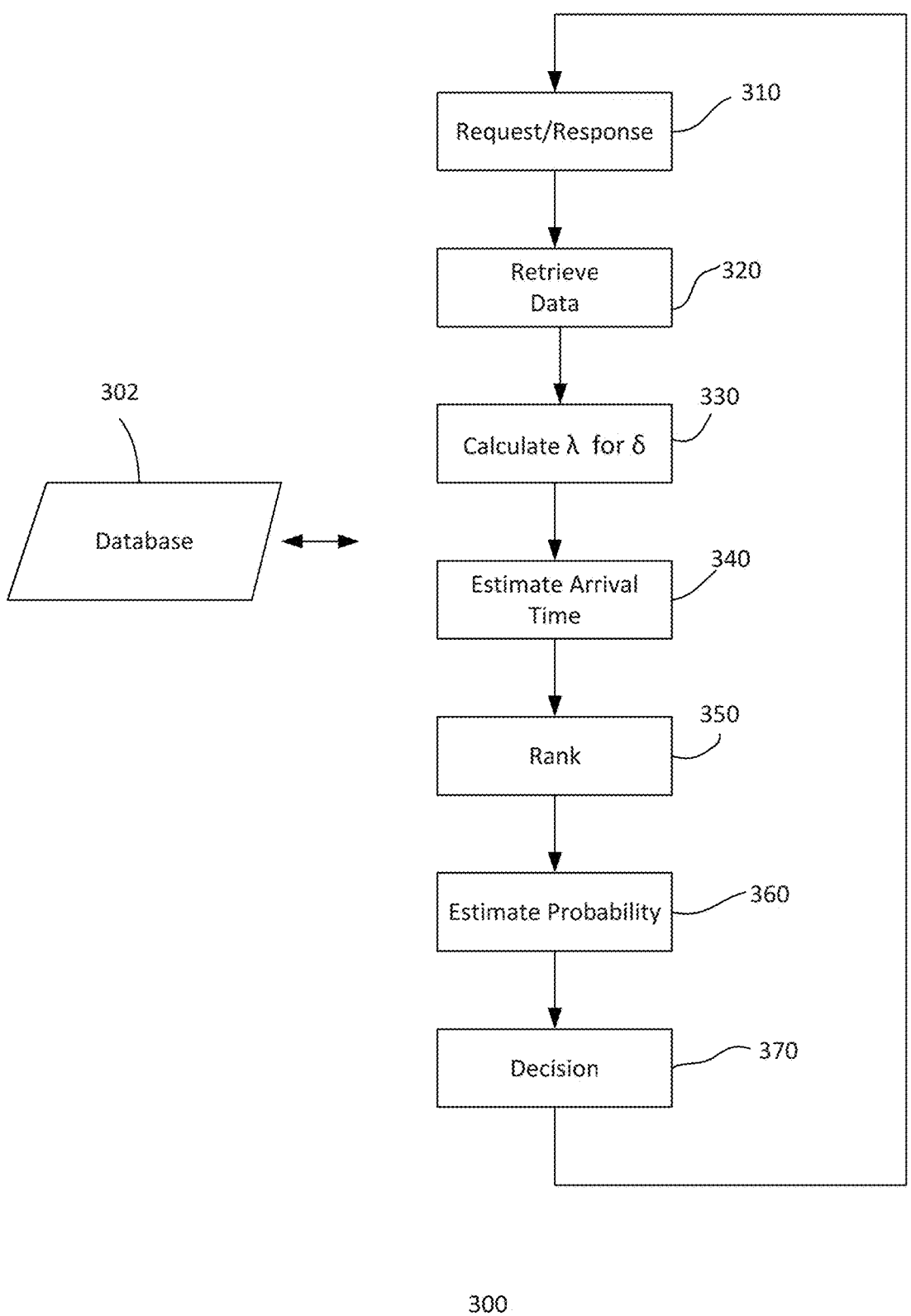
FIG. 3 illustrates an exemplary process.

FIG. 3 shows an exemplary process 300 for implementing, at least in part, the technology described herein. In particular, process 300 depicts a flow to a decision as to providing a service provider to a customer, such as a taxi to pick up a passenger. The process 300 may be performed by a computing device of, for example, a decision module. The decision module may be integrated as part of the intermediary agency. Other configurations of the decision module may also be useful. An example architecture of such a computer device is described below with reference to FIG. 4.

As discussed, the process utilize information stored in a database 302. The database may store information. Such information, for example, may include historical records of taxi responses, including location and time. The process at step 310 waits for a request from a customer for a service provider. For example, the process waits for taxi request from a customer. The request, as discussed, may be issued by a customer using a mobile application. The intermediary agency, for example, receives the request and broadcasts the request to taxis. A taxi may respond to the request. When the intermediary agency receives a first response to service the request, the decision module retrieves information from the database at step 320. In one implementation, the decision module retrieves historical records of taxi responses. The historical records may be related to time period and location of the request. Using the retrieved information, the decision module calculates λ for a given time interval δ at step 330.

At step 340, the decision module estimates the arrival time of the taxi which responded to the request. In one implementation, the estimated arrival time takes into account GIS data and real time traffic data. For example, the Taxi Arriving Time estimator of the decision module estimates the arrival time of the taxi. In addition, the arrival time of near-by taxis are also estimated. For example, the intermediary agency may be able track locations of near-by taxis and estimate their arrival times to the customer using the real-time taxi distribution data. The decision module, at step 350, ranks the different taxis, including the taxi which responded, based on arrival time. For example, the ranking may be from quickest to slowest arrival time.

The decision module estimates the probability of a shorter waiting time for the customer at step 360. For example, the decision-making handler estimates the probability using equation 3. Once the probability is estimated, the decision handler, at step 370, makes a decision. For example, the decision may be to wait for another taxi with a quicker arrival time to respond within δ. If no taxi with a quicker arrival time responds within δ, the decision handler issues an order to the taxi which responded. On the other hand, the probability may be low that another taxi with quicker arrival time will response. In such case, an order will be issued to the taxi which first responded. After the decision is made, the process returns to step 310 and waits for the next request.

Figure 4:
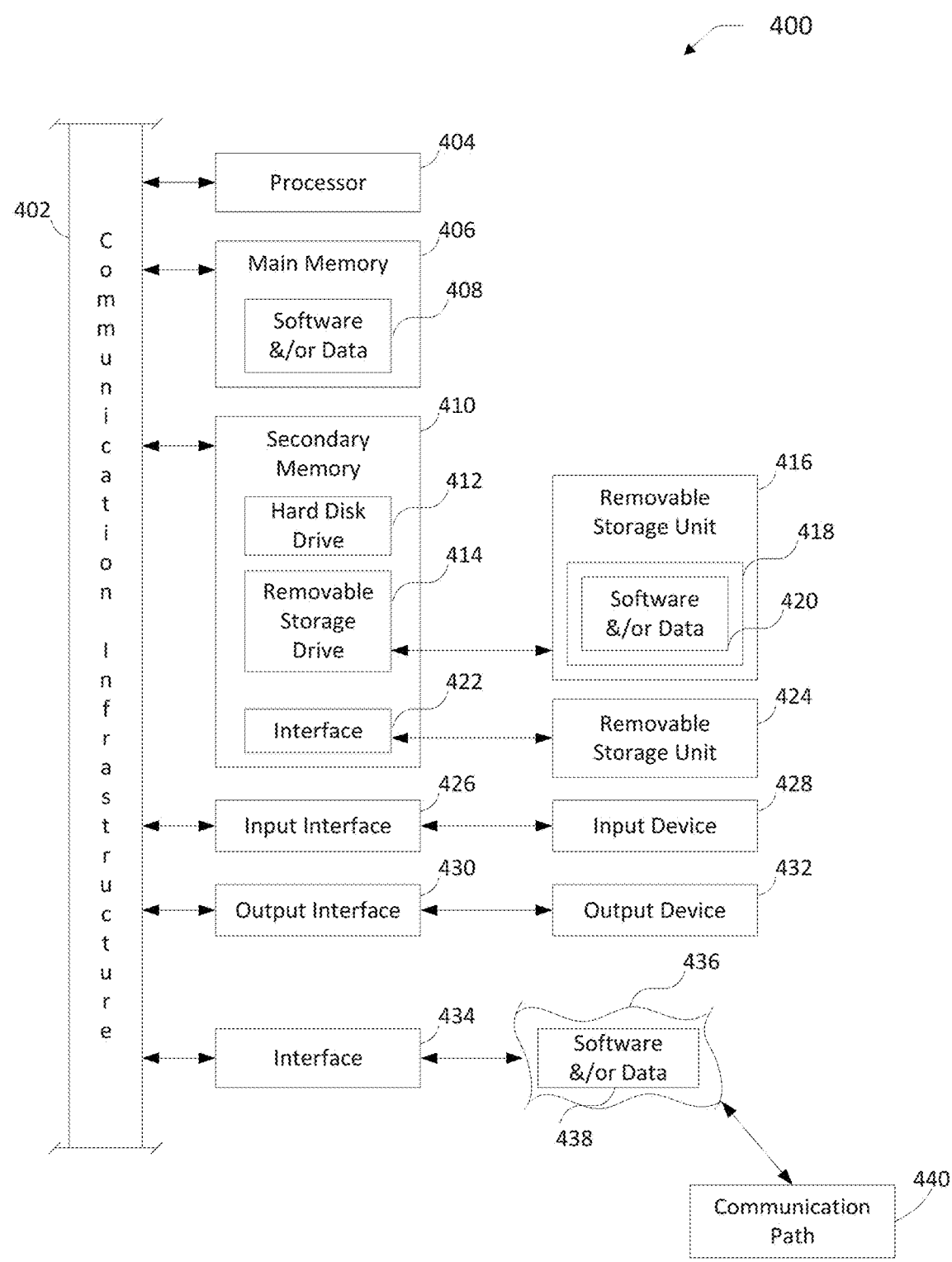
FIG. 4 illustrates an exemplary computing system to implement in accordance with the technologies described herein.

FIG. 4 illustrates an exemplary system 400 that may implement, at least in part, the technologies described herein. The computer system 400 includes one or more processors, such as processor 404. Processor 404 can be a special-purpose processor or a general-purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc. which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar storage for allowing computer programs or other instructions to be loaded into computer system 400. Such storage may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g. Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A computer implemented method for determining a service provider to service a customer request comprising:

receiving, by a decision module, over a first computer network, a request from a software application executed on a mobile device of a customer, the request comprising a request time and a location of the customer, the location being determined by a first wireless communication network or GPS data;

receiving, by the decision module, over a second computer network, which may be the second computer network, a response to the request from a first service provider, wherein the response indicates that the first service provider desires to service the request;

receiving a response to the request from a first service provider by the decision module, wherein the response indicates that the first service provider desires to service the request, the response comprising a location of the first service provider determined by a second wireless communication network, which may be the first wireless communication network, or GPS data;

determining, by the decision module, the average frequency of responses for a given time interval during the time and location of the request;
estimating, by the decision module, an arrival time of the first service provider and near-by service providers to the location of the customer based at least in part on real-time traffic data automatically retrieved by the decision module from a real-time graphical information navigation service with real-time traffic flow data, locations of the near-by service providers being determined by a third wireless communication network, which may be the same as the first or second wireless communication networks, or GPS data;
ranking all service providers based on arrival time;
estimating a probability of a shorter customer wait time, the estimating a probability of a shorter customer wait time comprising using:

$$P(X = x | \delta, \lambda) = \frac{e^{-\lambda}\lambda^x}{x!};$$

if the probability of a shorter customer wait time is higher than a threshold,
  (i) waiting for a service provider with shorter customer wait time to respond to the request,
  (ii) automatically issuing an order over a third computer network, which may be the same as the first or second computer networks, to the service provider with the shorter customer wait time to service the request, wherein issuing the order to the service provider with the shorter customer wait time reduces the time the customer waits for a service provider to arrive, and
  (iii) if no service provider with a shorter customer wait time responds to the request within a prescribed period of time, automatically issuing the order over the third computer network to the first service provider to service the request; and
if the probability of a shorter customer wait time is lower than a threshold, automatically issuing the order over the third communication network to the first service provider to service the request.

2. The method of claim 1, wherein the service provider is a taxi driver and the customer is a passenger.

3. The method of claim 1, wherein the average frequency of responses for a given time interval is based on historical records of taxi responses.

4. The method of claim 1, wherein the average frequency of responses is a Poisson distribution.

5. The method of claim 1 wherein estimating a probability of shorter customer wait time comprises using:

$$Prob(X = x) = P(X = x | \delta, \lambda)P(X = x | M, N) = \frac{e^{-\lambda}\lambda^x}{x!}\left(1 - \frac{C^x_{M-1-N}}{C^x_{M-1}}\right).$$

6. A decision module for determining a service provider to service a customer request comprising:
  a storage comprising historical records of service provider responses, service provider distribution data, GIS data and real time traffic data, the real-time traffic data automatically retrieved from a real-time graphical information navigation service with real-time traffic flow data; and
  a processor, coupled to the storage, the processor configured to receive a request from a customer for service from a service provider and a response to the request by a first service provider to service the request, the processor comprises, the request from the customer comprising a location of the customer determined by a first wireless communication network or GPS data and the request from the service provider comprising a location of the service provider determined by a second wireless communication network, which may be the first wireless communication network, or GPS data, the processor comprising:
    a time arrival estimator, the time arrival estimator estimating an arrival time of the first service provider to the customer and arrival times of near-by service providers from the service provider distribution data, including based on locations of the near-by service providers determined by a third wireless communication network, which may be the first or second wireless communication networks, or GPS data,
    a decision-making handler, wherein the decision making handler comprises,
      a service provider response probability model for determining a number of service providers which may respond to the request, and
      a customer waiting time reduction probability model for determining a probability of a shorter wait time for the customer to have the request serviced, the customer waiting time reduction probability model using historical service provider response times and comprising computer executable instructions for:
        determining a probability of occurrences of service provider responses for a given number of possible service providers; and
        determining a probability that at least a first service provider for a given number of possible service provider will have a faster response time than at least a second service provider of the given number of possible service providers,
      wherein the decision-making handler decides,
        if the probability of a shorter customer wait time is higher than a threshold,
          (i) wait for a service provider with a shorter customer wait time to respond to the request,
          ii) automatically issue an order over a first communication network to the service provider with the shorter customer wait time to service the request, wherein issuing the order to the service provider with the shorter customer wait time reduces the time the customer waits for a service provider to arrive, and
          (iii) if no service provider with a shorter customer wait time responds to the request within a prescribed period of time, automatically issue the order over the first communication network to the first service provider to service the request; and
        if the probability of a shorter customer wait time is lower than a threshold, automatically issue the order over the first communication network to the first service provider to service the request.

7. The device of claim 6, wherein the service providers are taxis and the customers are passengers.

8. The method of claim 6 wherein the customer waiting time reduction probability model comprises $$Prob(X=x) = P(X=x\mid \delta, \lambda)P(X=x\mid M, N) = \frac{e^{-\lambda}\lambda^x}{x!}\left(1 - \frac{C_{M-1-N}^x}{C_{M-1}^x}\right).$$

9. The device of claim 6, wherein the service provider response probability model comprises $$P(X=x\mid \delta, \lambda) = \frac{e^{-\lambda}\lambda^x}{x!}.$$

10. A non-transitory computer-readable medium having stored thereon program code, the program code executable by a computer for determining a service provider to service a customer request comprising:
  receiving, by a decision module over a first computer network, a request from a software application executed on a mobile device of a customer, the request comprising a request time and a location of the customer, the location being determined by a first wireless communication network or GPS data;
  receiving, by the decision module over a second computer network, which may be the same as the first computer network, a response to the request from a first service provider, wherein the response indicates that the first service provider desires to service the request, the response comprising a location of the first service provider determined by a second wireless communication network, which may be the first wireless communication network, or GPS data;
  determining, by the decision module, the average frequency of responses for a given time interval during the time and location of the request;
  estimating, by the decision module, arrival times of the first service provider and near-by service providers to the location of the customer based at least in part on real-time traffic data automatically retrieved by the decision module from a real-time graphical information navigation service with real-time traffic flow data, locations of the near-by service providers being determined by a third wireless communication network, which may be the same as the first or second communication networks, or GPS data;
  ranking all service providers based on arrival time;
  based at least in part on the determined average frequency of responses for a given time interval, estimating a probability of a shorter customer wait time, the estimating a probability of a shorter customer wait time associated with an identified service provider comprising using historical records of service provider responses;
  if the probability of a shorter customer wait time is higher than a threshold,
    (i) wait for a service provider with a shorter customer wait time to respond to the request,
    (ii) automatically issue an order over a second computer network, which may be the same as the first or second computer networks, to the service provider with the shorter customer wait time to service the request, wherein issuing the order to the service provider with the shorter customer wait time reduces the time the customer waits for a service provider to arrive, and
    (iii) if no service provider with a shorter customer wait time responds to the request within a prescribed period of time, automatically issue the order over the third computer network to the first service provider to service the request; and
  if the probability of a shorter customer wait time is lower than a threshold, automatically issue the order over the third communication network to the first service provider to service the request.

11. The non-transitory computer-readable medium of claim 10, wherein the average frequency of responses for a given time interval is based on historical records of taxi responses.

12. The non-transitory computer-readable medium of claim 10, wherein the average frequency of responses is a Poisson distribution.

13. The non-transitory computer-readable medium of claim 10, wherein the service provider is a taxi driver and the customer is a passenger.

* * * * *